Feb. 25, 1964

F. O. LUENBERGER 3,122,384

AXIALLY ADJUSTABLE DRIVE MECHANISM

Filed June 12, 1961

INVENTOR.
FREDERICK O. LUENBERGER
BY
Flam and Flam
ATTORNEYS.

Feb. 25, 1964
F. O. LUENBERGER
3,122,384
AXIALLY ADJUSTABLE DRIVE MECHANISM
Filed June 12, 1961
2 Sheets-Sheet 2
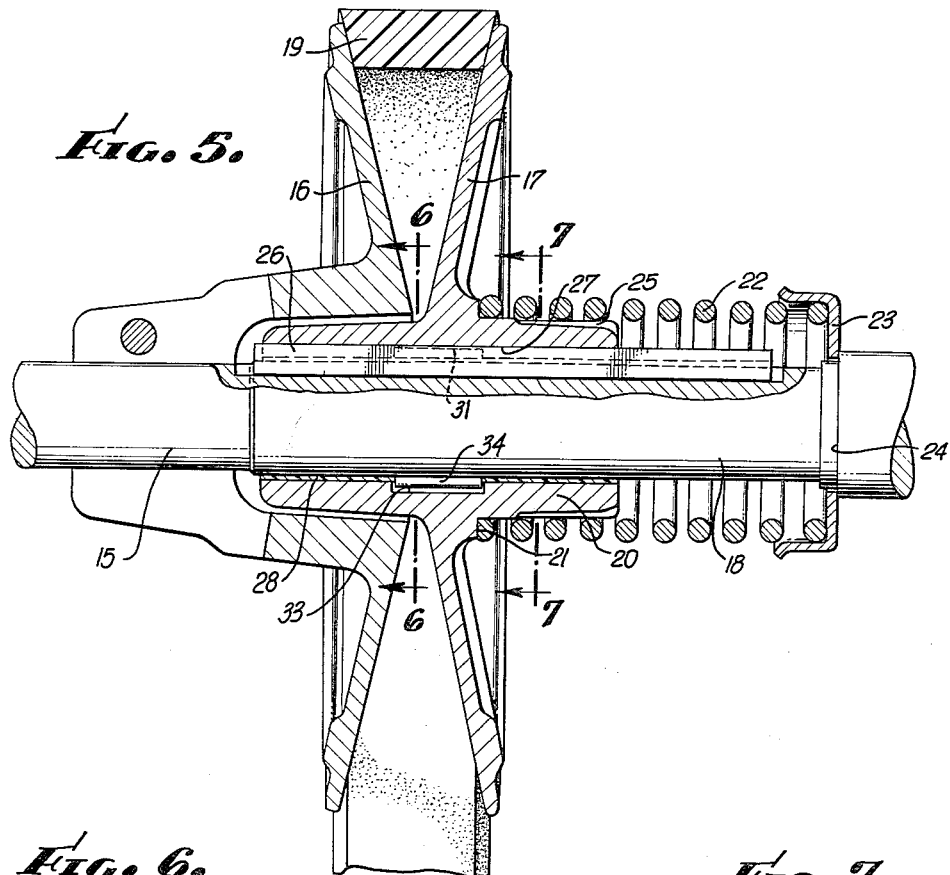
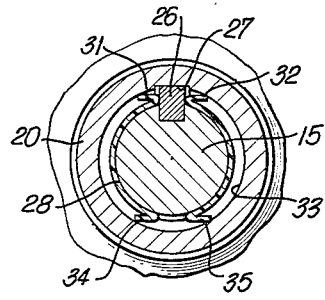
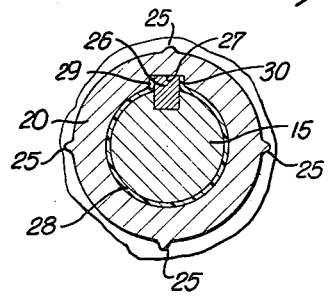
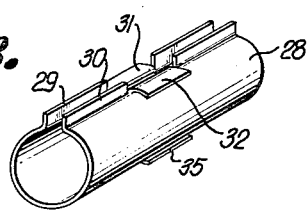
INVENTOR.
FREDERICK O. LUENBERGER
BY
Flam and Flam
ATTORNEYS.

United States Patent Office 3,122,384
Patented Feb. 25, 1964

3,122,384
AXIALLY ADJUSTABLE DRIVE MECHANISM
Frederick O. Luenberger, Los Angeles, Calif., assignor, by mesne assignments, to The Emerson Electric Manufacturing Company, St. Louis, Mo., a corporation of Missouri
Filed June 12, 1961, Ser. No. 116,531
7 Claims. (Cl. 287—52.04)

This invention relates to drive mechanisms adapted to be connected to shafts, that are axially adjustable.

One example of the use of such drive connections is exemplified by an axially adjustable pulley section mounted on a shaft by the aid of a spline or key, the pulley section having an inclined face. By moving the section toward or away from a companion section mounted on the shaft so as to cause an intervening edge-active belt to move radially outwardly or inwardly, the effective pulley diameter can be varied. Such structures are now widely used.

In such structures it is also common to utilize metal, such as steel or stainless steel, for the relatively movable parts of the drive. Accordingly, lubrication at rather frequent intervals is quite essential.

It is one of the objects of this invention to obviate substantially entirely such lubrication.

It is another object of this invention to provide a non-metallic sleeve-like member extending around the shaft and in sliding relation with respect to the shaft or the pulley, the friction between the member and the relatively sliding part being very small.

It is still another object of this invention to construct such a sleeve-like member from plastic material, which may be formed integrally with the key or spline. Such a structure has marked advantages when large driving forces or torques are transmitted by the key or spline; such forces tend to tilt or wedge the key or spline; and such tendency is substantially entirely eliminated where the key or spline is formed integrally with the sleeve-like member.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIG. 5 is a view, similar to FIG. 1, of a modified form of the invention;

Figure 1:
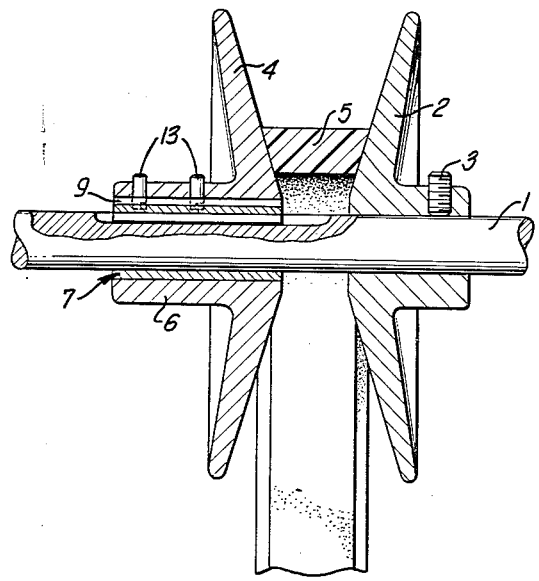
FIGURE 1 is a sectional view of an adjustable pulley structure embodying the invention.
Figure 3:
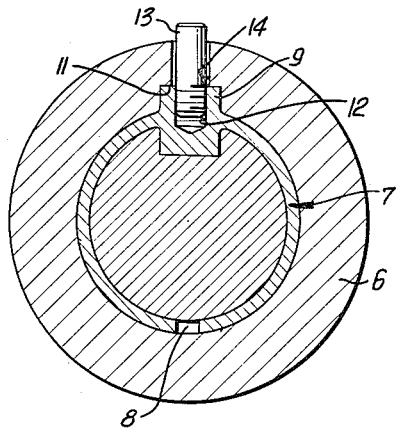
FIG. 3 is a sectional view, taken along the plane corresponding to line 3—3 of FIG. 2.
Figure 2:
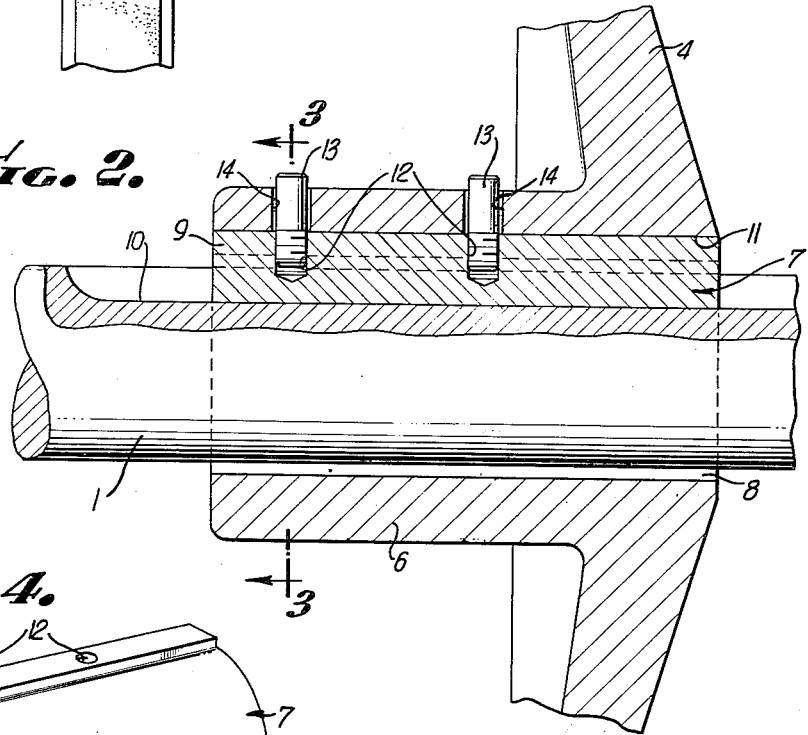
FIG. 2 is an enlarged fragmentary sectional view, the section showing a hub structure of the pulley structure.

FIGS. 6 and 7 are sectional views, taken along planes corresponding to lines 6—6 and 7—7, respectively, of FIG. 5; and FIG. 8 is a pictorial view of a bushing incorporated in the form of the invention illustrated in FIGS. 5, 6 and 7.

In the form shown in FIGS. 1 to 4, inclusive, a shaft 1 is shown upon which is mounted an adjustable diameter pulley structure. This pulley structure may include, for example, a pulley section 2 firmly affixed to shaft 1 as by the aid of a set screw 3. Another pulley section 4 cooperates with pulley section 2 for the reception of an edge-active belt 5.

The active faces of the sections 2 and 4 are shown as conical so as to engage opposite edges of belt 5.

In order to effect adjustment of the pulley section 4, it is made axially movable with respect to the shaft 1.

Figure 4:
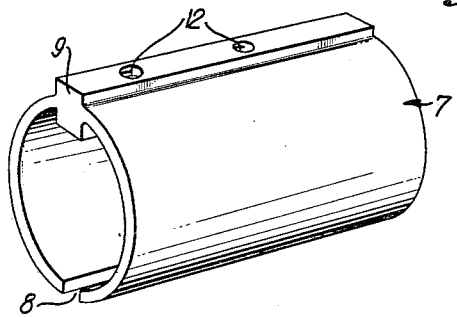
FIG. 4 is a pictorial view of a bushing forming an element of the apparatus shown in FIGS. 1, 2 and 3.

In order to provide a sliding connection between the hub 6 of pulley section 4 and the shaft 1, use is made of a bushing 7 illustrated most clearly in FIG. 4. This bushing 7 is interposed between the interior cylindrical surface of the hub 6 and the exterior periphery of the shaft 1. It is made of a plastic having a relatively low coefficient of friction with respect to the metal parts with which it is in contact, such as shaft 1. A suitable plastic for this bushing may be Nylotron, which is a nylon plastic mixed with molybdenum disulphide.

The bushing 7 has a longitudinal opening 8 (FIG. 3) providing a slit extending longitudinally of the bushing from end to end.

Furthermore, an integral key member 9 is formed on the bushing 7. This key member has an inwardly projecting part seated in the keyway 10 (FIG. 2) of the shaft 1. An outwardly extending portion similarly fits into a keyway 11 in the hub 6.

In the present instance, the bushing 7 is joined to the hub 6 so as to be movable therewith. For this purpose, one or more tapped apertures 12 are provided in the outer surface of the key 9. Engaging these apertures are a plurality of pins 13 threaded at their inner ends for engagement with the apertures 12. These pins 13 project through appropriate clearance apertures 14 in the hub 6.

Since the bushing 7 does not form a complete sleeve over the shaft 1, expansion and contraction of the bushing under its conditions of operation will not interfere with the free motion of the bushing 7 and the hub 6. Furthermore, since the key or spline 9 is integrally formed with the bushing 7, it can effectively transmit rotary forces between the pulley section 4 and the shaft 1. The figures indicate the pulley structure at near its smallest effective diameter. By moving section 4 rightward, the effective diameter may be increased.

Although the invention is shown as embodied in connection with a variable diameter pulley structure, it is useful as well in connection with any relatively movable spline structures. Lubrication between the sliding parts can be substantially entirely eliminated without danger of binding. If desired, the metal parts, such as shaft 1, may be chrome-plated further to eliminate the possibility of corrosion as well as to improve the operating quality of the structure, although no lubrication is provided. Furthermore, the annular portions of the bushing 7 joined to the key or spline 9 render the position of the key much more stable, and skewing or wedging of the key 9 is prevented.

In the form of the invention illustrated in FIGS. 5 to 8, inclusive, the shaft 15 fixedly carries a pulley section 16. The opposed pulley section 17 is arranged for axial adjustment along the axis of the shaft 15, and is mounted on a somewhat enlarged portion 18 of shaft 15.

The two sections 16 and 17 cooperate with the edges of an edge-active belt 19.

The section 17 has an elongated hub 20. A shoulder 21 is formed between the hub 20 and the rear side of the pulley section 17. This shoulder serves as an abutment for a compression spring 22 for axially urging the pulley section 17 toward the pulley section 16. A cup 23 engaging a shoulder 24 of shaft 15 serves as an abutment for the righthand end of the spring 22. The righthand portion of the hub 20 may be provided with elevations or ribs 25 serving as a guide for the spring 22.

In this instance, the key or spline 26 is attached to the shaft 15. A keyway 27 is formed entirely through the hub 20 for guiding the sliding movement of the pulley section 17.

Interposed between the hub 20 and the shaft 15 is the bushing 28. This bushing may be made of a strip of plastic material, such as Nylotron. It has bent-up edges 29 and 30 which contact the sides of the key or spline 26 where the spline extends outwardly of the shaft, as shown most clearly in FIG. 7.

In order to anchor the bushing 28 within the hub 20, intermediate portions 31 and 32 of the edges 29 and 30 are turned outwardly, forming ears, as shown in FIG. 8. In order that these intermediate portions or ears may fit within the hub 20, the central portion of the bore 33 of the hub is enlarged, as indicated in FIGS. 5 and 6. Diametrically opposite the portions 31 and 32 are correspondingly outwardly turned portions 34 and 35, shown most clearly in FIGS. 6 and 8. These portions are formed by appropriate slitting of the bushing 28. The length of the outwardly turned portions is such as to fit with clearance into the enlarged portion of the bore 33.

The inventor claims:

1. In a rotary drive structure including a rotary shaft and an element placed so that the shaft and the element are in driving relation; a key carried by the shaft and extending into a keyway located in the element, the keyway permitting relative sliding axial motion between the shaft and the element; and a non-metallic bushing interposed between and in contact with the element and the shaft, said bushing having low friction properties with respect to the shaft and the element and having a longitudinal split from end to end of the bushing to permit the passage therethrough of said key, said split for at least a portion of its length having outwardly turned edges extending along opposite sides of the key, and located between the keyway and the key.

2. The combination as set forth in claim 1, in which an intermediate portion of the edges are folded to form a connection between the bushing and the element.

3. The combination as set forth in claim 1, in which an intermediate portion of the edges are folded to form a connection between the bushing and the element, the bushing being made of plastic.

4. The combination as set forth in claim 1, in which an intermediate portion of the edges are folded to form a connection between the bushing and the element, the bushing being made of plastic; and having folded over portions diametrically opposite said folded over portions of the edges to complement the connection between the bushing and the element.

5. A bushing made from plastic material and having a low coefficient friction with respect to metal surfaces, said bushing being an interrupted annulus; at least a portion of the edges of the annulus along the length of the interruption extending in parallel fashion substantially radially outwardly.

6. The combination as set forth in claim 5, in which the center portions of the edges are turned down and outwardly to extend transversely of the remaining portions of the edges.

7. The combination as set forth in claim 1 in which the element has an internal annular recess surrounding said shaft, and in which an intermediate portion of the edges of the split are folded to form ears that fit into said recess to prevent relative axial movement between the bushing and the element.

References Cited in the file of this patent

UNITED STATES PATENTS

| | | |
|---|---|---|
| 2,266,499 | Leake | Dec. 16, 1941 |
| 2,343,367 | Conradson | Mar. 7, 1944 |
| 2,433,150 | Palm | Dec. 23, 1947 |
| 2,475,800 | Munroe | July 12, 1949 |
| 2,812,666 | Huck | Nov. 12, 1957 |
| 2,835,540 | Jorgensen | May 20, 1958 |
| 2,944,433 | Myers | July 12, 1960 |

FOREIGN PATENTS

| | | |
|---|---|---|
| 778,816 | Great Britain | July 10, 1957 |